(12) United States Patent
Jochim et al.

(10) Patent No.: US 12,124,335 B1
(45) Date of Patent: Oct. 22, 2024

(54) FAULT TOLERANT DISTRIBUTED COMPUTING SYSTEM BASED ON DYNAMIC RECONFIGURATION

(71) Applicant: GM Global Technology Operations LLC, Detroit, MI (US)

(72) Inventors: Markus Jochim, Troy, MI (US); Khaja Shazzad, Windsor (CA); Yuchen Zhou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/350,358

(22) Filed: Jul. 11, 2023

(51) Int. Cl.
G06F 11/14 (2006.01)
G06F 11/16 (2006.01)
G06F 11/18 (2006.01)

(52) U.S. Cl.
CPC .......... G06F 11/142 (2013.01); G06F 11/165 (2013.01); G06F 11/181 (2013.01)

(58) Field of Classification Search
CPC ..... G06F 11/142; G06F 11/165; G06F 11/181
See application file for complete search history.

(56) References Cited

U.S. PATENT DOCUMENTS

| | | | | |
|---|---|---|---|---|
| 5,471,469 A * | 11/1995 | Flammer, III | ......... | H04B 1/713 370/347 |
| 6,151,688 A * | 11/2000 | Wipfel | ................ | G06F 11/008 709/224 |
| 6,993,034 B1 * | 1/2006 | Block | ................ | H04L 45/54 709/245 |
| 2007/0268819 A1 * | 11/2007 | Johansson | ............ | G06F 11/004 370/242 |
| 2009/0252047 A1 * | 10/2009 | Coffey | ................ | G06F 11/076 370/252 |
| 2010/0185894 A1 * | 7/2010 | Herta | ................ | G06F 11/2035 709/224 |
| 2014/0195672 A1 * | 7/2014 | Raghavan | ............ | H04L 67/025 709/224 |
| 2018/0060460 A1 * | 3/2018 | Zhang | ................ | H04L 43/50 |
| 2024/0231873 A1 * | 7/2024 | Jigalur | ............... | G06F 9/45558 |

* cited by examiner

*Primary Examiner* — Matthew M Kim
*Assistant Examiner* — Matthew N Putaraksa
(74) *Attorney, Agent, or Firm* — Vivacqua Crane, PLLC

(57) ABSTRACT

A fault tolerant distributed computing system includes a communication link and a plurality of nodes in electronic communication with one another by the communication link. Each node executes at least one node-specific application, includes a standby database that stores a standby copy corresponding to one of the node-specific applications executed by one of the remaining nodes that are part of the distributed computing system, and includes a spare computational capacity sufficient to execute at least one standby copy of one of the node-specific applications stored in the standby database. In response to determining a specific node is non-operational, the remaining nodes execute all the standby copies of the one or more node-specific applications that were previously executed by the specific node that is now non-operational.

20 Claims, 2 Drawing Sheets

FAULT TOLERANT DISTRIBUTED COMPUTING SYSTEM BASED ON DYNAMIC RECONFIGURATION

INTRODUCTION

The present disclosure relates to a fault tolerant distributed computing system that includes a plurality of nodes in electronic communication with one another, where the nodes are dynamically reconfigured in response to detecting one or more nodes are non-operational.

Distributed computing systems include multiple computing devices, which are also referred to as nodes, that transmit and receive information over a communication link. The communication link may be implemented in hardware such as, for example, a bus-based communication network, or wirelessly. Dynamic reconfiguration refers to a change in a set of processes that a node is executing. Fault tolerance refers to the ability of a system to continue to operate in the presence of faults that are included as part of a fault model. The fault model defines the number and the type of faults that may affect the system that may be tolerated.

In one specific implementation of a distributed computing system, the 10Base-T network communication protocol is used. In this implementation, the distributed computing system includes multiple electronic control units (ECUs) are in electronic communication with one another by a twisted pair cable. During operation, a primary node may execute multiple mission-critical applications, while one or more secondary nodes execute one or more non-mission critical applications, which are referred to as secondary operations. During operation, a state transfer occurs when the primary node transfers the data pertaining to the mission-critical applications to the secondary nodes. If the primary node becomes non-operation due to a fault, then one of the secondary nodes may then execute the mission-critical applications that were previously being executed by the primary node. However, because of limited computing power, the secondary node no longer executes the secondary applications. One approach to alleviate this issue involves including completely redundant secondary nodes, which introduces additional complexity and components to the communication system.

Thus, while distributed computing systems achieve their intended purpose, there is a need in the art for an improved approach for dynamic reconfiguration management.

SUMMARY

According to several aspects, a fault tolerant distributed computing system is disclosed, and includes a communication link and a plurality of nodes in electronic communication with one another by the communication link. Each node executes at least one node-specific application, includes a standby database that stores a standby copy corresponding to one of the node-specific applications executed by one of the remaining nodes that are part of the distributed computing system, and includes a spare computational capacity sufficient to execute at least one standby copy of one of the node-specific applications stored in the standby database. The plurality of nodes execute instructions to: during a unique transmission opportunity corresponding to a specific node, monitor, by the remaining nodes that are part of the distributed computing system, the communication link for data transmitted by the specific node, observe, by the remaining nodes that are part of the distributed computing system, silence during the unique transmission opportunity for the specific node, and in response to observing silence during the unique transmission opportunity for the specific node, determine the specific node is non-operational. In response to determining the specific node is non-operational, the remaining nodes execute all the standby copies of the one or more node-specific applications that were previously executed by the specific node that is now non-operational.

In another aspect, each node-specific application executed by the specific node that is part of the distributed computing system is stored by the standby database corresponding to one of the remaining nodes that are part of the distributed computing system.

In yet another aspect, a number of node-specific applications executed by each node is equal to the number of remaining nodes that are part of the distributed computing system.

In an aspect, each of the remaining nodes that are part of the distributed computing system store one of the node-specific applications executed by the specific node in a corresponding standby database.

In another aspect, the remaining nodes that are part of the distributed computing system store more than one node-specific application executed by the specific node in a corresponding standby database.

In yet another aspect, the data transmitted by the specific node includes one of the following: state information, application data, or an alive code.

In an aspect, the communication link is a bus.

In another aspect, the communication link is implemented based on one of the following: the 10Base-T network communication protocol, switched Ethernet, the controller area network (CAN) protocol, and an automotive communication protocol based on the International Organization for Standardization (ISO) 17458-1 to 17458-5.

In yet another aspect, the communication link is implemented wirelessly.

In an aspect, the communication link is implemented based on the Institute of Electrical and Electronics Engineers (IEEE) 802.11 family of standards.

In another aspect, the communication link is implemented based on a network communication protocol where state information sent by any node that is part of distributed computing system is visible to the remaining nodes, and that affords a periodic, guaranteed transmission opportunity to all the nodes that are part of the fault tolerant distributed computing system.

In yet another aspect, the plurality of nodes represent electronic control modules (ECUs) that control one or more systems that are part of a vehicle.

In an aspect, the nodes represent one of the following: smart sensors and smart actuators.

In another aspect, a method for dynamically reconfiguring a plurality of nodes in electronic communication with one another by a communication link that are part of a fault tolerant distributed computing system is disclosed. The method includes during a unique transmission opportunity corresponding to a specific node, monitoring, by the remaining nodes that are part of the distributed computing system, the communication link for data transmitted by the specific node, where each node executes at least one node-specific application and includes a standby database that stores a standby copy that stores a standby copy corresponding to one of the node-specific applications executed by one of the remaining nodes that are part of the distributed computing system. The method includes observing, by the remaining nodes that are part of the distributed computing system, silence during the unique transmission opportunity for the specific node. In response to observing silence during the unique transmission opportunity for the specific node, the method includes determining the specific node is non-operational. In response to determining the specific node is non-operational, the method includes executing all the standby copies of the one or more node-specific applications that were previously executed by the specific node that is now non-operational by the remaining nodes that are each part of the distributed computing system, where each node includes a spare computational capacity sufficient to execute at least one standby copy of one of the node-specific applications stored in the standby database.

In another aspect, a fault tolerant distributed computing system for a vehicle is disclosed, and includes a communication link that is implemented as a bus and a plurality of nodes in electronic communication with one another by the communication link, where the plurality of nodes represent ECUs that control one or more systems that are part of the vehicle, and where each node executes at least one node-specific application, includes a standby database that stores a standby copy corresponding to one of the node-specific applications executed by one of the remaining nodes that are part of the distributed computing system, and includes a spare computational capacity sufficient to execute at least one standby copy of one of the node-specific applications stored in the standby database. The plurality of nodes execute instructions to: during a unique transmission opportunity corresponding to a specific node, monitor, by the remaining nodes that are part of the distributed computing system, the communication link for data transmitted by a specific node, observe, by the remaining nodes that are part of the distributed computing system, silence during the unique transmission opportunity for the specific node, in response to observing silence during the unique transmission opportunity for the specific node, determine the specific node is non-operational, and in response to determining the specific node is non-operational, execute all the standby copies of the one or more node-specific applications that were previously executed by the specific node that is now non-operational by the remaining nodes that are each part of the distributed computing system.

In yet another aspect, each node-specific application executed by the specific node that is part of the distributed computing system is stored by the standby database corresponding to one of the remaining nodes that are part of the distributed computing system.

In an aspect, a number of node-specific applications executed by each node is equal to the number of remaining nodes that are part of the distributed computing system.

In another aspect, each of the remaining nodes that are part of the distributed computing system store one of the node-specific applications executed by the specific node in a corresponding standby database.

In yet another aspect, the remaining nodes that are part of the distributed computing system store more than one node-specific application executed by the specific node in a corresponding standby database.

In an aspect, the data transmitted by the specific node includes one of the following: state information, application data, or an alive code.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
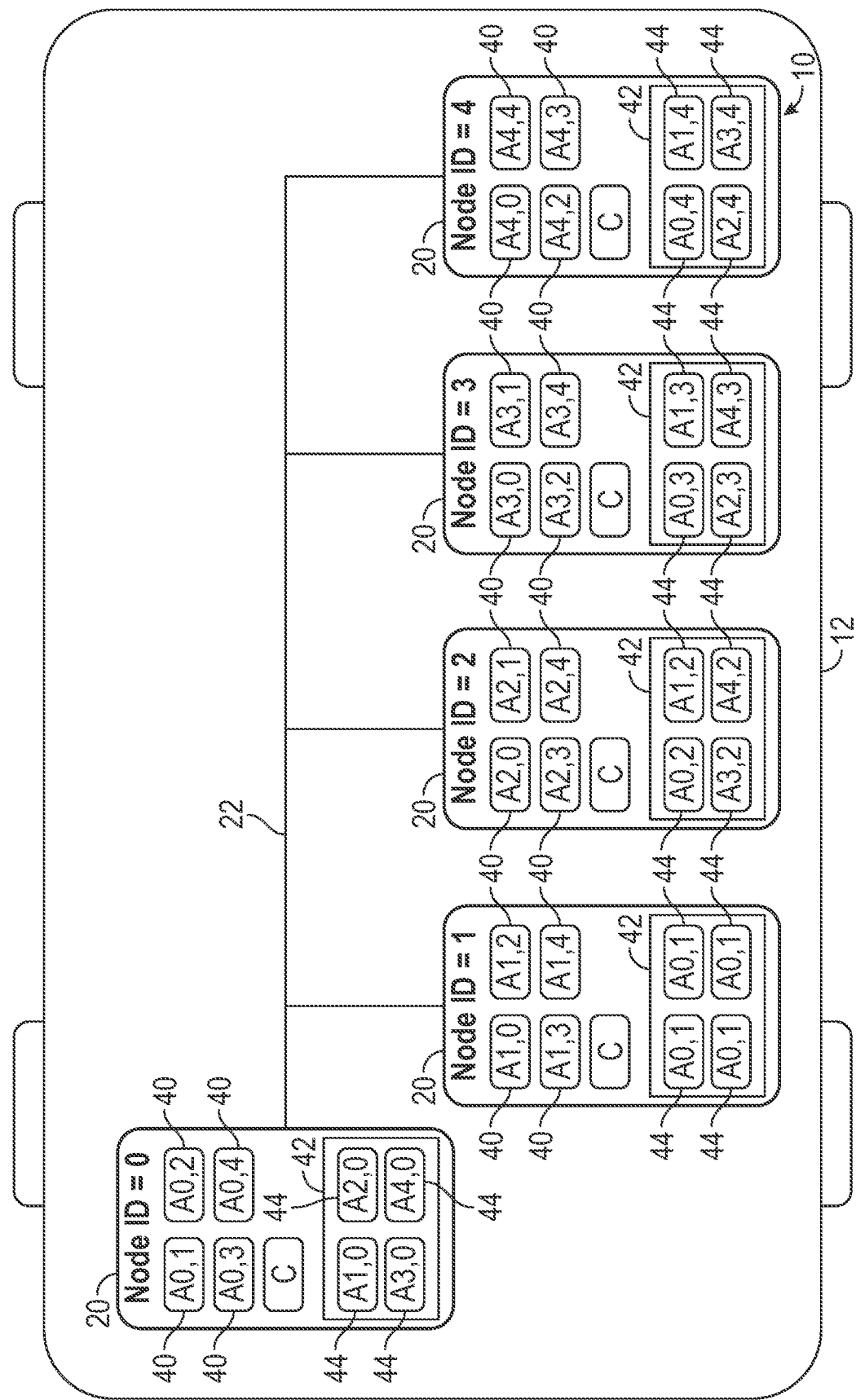
FIG. 1 is a schematic diagram of a vehicle including the disclosed distributed computing system including a primary node and a plurality of secondary nodes, according to an exemplary embodiment.

Referring to FIG. 1, a schematic diagram illustrating an exemplary fault tolerant distributed computing system 10 that is part of a vehicle 12 is shown. The distributed computing system 10 includes a plurality of nodes 20 in electronic communication in electronic communication with one another by a communication link 22. The communication link 22 is implemented either in hardware, such as a bus communication system, or wirelessly. In the non-limiting embodiment as shown in FIG. 1, the distributed computing system 10 is implemented as part of a vehicle such as, but not limited to, a sedan, truck, sport utility vehicle, van, or motor home. However, it is to be appreciated that FIG. 1 is merely exemplary in nature and the disclosed distributed computing system 10 is not limited to a vehicle. Indeed, the distributed computing system 10 may be implemented in a variety of other applications such as, for example, industrial automation control systems and the Internet of things (IoT).

In one non-limiting embodiment, the communication link 22 is a bus that is implemented based on the 10Base-T network communication protocol. In another embodiment, the network communication protocol is based on switched Ethernet, the controller area network (CAN) protocol, or the automotive communication protocol based on the International Organization for Standardization (ISO) 17458-1 to 17458-5. In another embodiment, the communication link 22 is implemented wirelessly based on the Institute of Electrical and Electronics Engineers (IEEE) 802.11 family of standards. It is to be appreciated that the distributed computing system 10 is implemented based on any other type of network communication protocol where state information sent by any node 20 that is part of the distributed computing system 10 is visible to the remaining nodes and that affords a periodic, guaranteed transmission opportunity to all the nodes 20 that are part of the distributed computing system 10.

The nodes 20 each represent computing devices including one or more processors and memory. In one non-limiting embodiment, the nodes 20 represent electronic control modules (ECUs) that control one or more systems that are part of the vehicle 12. In an embodiment, the nodes 20 may represent devices such as smart sensors and smart actuators. In the example as shown in FIG. 1, there are five nodes 20 that are part of the system, where each node 20 is assigned a unique node identifier or node ID. The nodes 20 include the node identifiers 0, 1, 2, 3, and 4 (Node ID=0, Node ID=1, Node ID=2, Node ID=3, Node ID=4).

As seen in FIG. 1, each node 20 that is part of the distributed computing system 10 executes at least one node-specific application 40. In the example as shown, the nodes 20 each execute four node-specific applications 40 that are denoted as $A_{i,j}$, where i represents the node identifier, j represents an application identifier, and the node identifier is not equal to the application identifier, or i≠j. In the example as shown, the node 20 assigned the node identifier 0 executes four applications, A0,1, A0,2, A0,3, A0,4, the node 20 assigned the node identifier 1 executes four applications A1,0, A1,2, A1,3, A1,4, the node 20 assigned the node identifier 2 executes four applications A2,0, A2,1, A2,3, A2,4, the node 20 assigned the node identifier 3 executes four applications A3,0, A3,1, A3,2, A3,3, A3,4, and the node assigned the node identifier 4 executes four applications A4,0, A4,1, A4,2, A4,3.

Each node 20 that is part of the distributed computing system 10 also includes a standby database 42, where the standby database 42 stores a duplicate or standby copy 44 corresponding to one of the node-specific applications 40 that is executed by one of the remaining nodes 20 that are part of the distributed computing system 10. Each node-specific application 40 executed by a node 20 that is part of the distributed computing system 10 is stored by the standby database 42 corresponding to one of the remaining nodes 20 that are part of the distributed computing system 10. Therefore, each node-specific application 40 executed by one of the nodes 20 is saved in the standby database 42 of one of the remaining nodes 20 that are part of the distributed computing system 10.

In one non-limiting embodiment, such as the example shown in FIG. 1, the number of node-specific applications 40 executed by each node 20 is equal to the number of remaining nodes 20 that are part of the distributed computing system 10. For example, the node 20 assigned the node identifier 0 executes four node-specific applications 40, and there are four remaining nodes 20 that are part of the distributed computing system 10. However, as mentioned above, FIG. 1 is merely exemplary in nature, and the nodes 20 are not limited to executing a number of node-specific applications 40 equal to the number of remaining nodes 20 that are part of the distributed computing system 10.

In the example as shown in FIG. 1, the standby database 42 stores a standby copy 44 corresponding to one of the node-specific applications 40 for each remaining node 20 that is part of the distributed computing system 10, and therefore the number of standby copies 44 stored in the standby database 42 is equal to the number of remaining nodes 20 that are part of the distributed computing system 10. For example, the node 20 assigned the node identifier 0 stores a standby copy 44 of a node-specific application 40 corresponding to the node 20 assigned the node identifier 1 (A1,0) the node identifier 2 (A2,0) the node identifier 3 (A3,0), and the node identifier 4 (A4,0), and the number of standby copies 44 stored in the standby database 42 is four, which is equal to the number of remaining nodes 20. However, it is to be appreciated that in embodiments, the standby database 42 may store more than one standby copy 44 of a node-specific application 40 corresponding to each remaining node 20 that is part of the distributed computing system 10 as well.

Each node 20 that is part of the distributed computing system 10 includes spare computational capacity C, where the spare computational capacity is sufficient to execute at least one standby copy 44 of one of the node-specific applications 40 stored in the standby database 42 of the corresponding node 20. In embodiments, the spare computational capacity C may be sufficient to execute more than one standby copy 44 stored in the standby database 42. For example, in an embodiment, the computational capacity C for the node 20 assigned the node identifier 0 is sufficient to execute two of the standby copies 44 that each correspond to one of the node-specific applications 40 stored in the standby database 42.

During operation, each node 20 transmits data during a unique transmission opportunity that is afford to each node 20 of the distributed computing system 10. The data may include one of the following: state information, application data, or an alive code. The alive code is transmitted in the event neither state information nor the application data are transmitted. During a unique transmission opportunity corresponding to a specific node 20 that is part of the distributed computing system 10, the remaining nodes 20 that are part of the distributed computing system 10 monitor the communication link 22 for the data transmitted by the specific node 20.

It is to be appreciated that if a specific node 20 experiences a fault that renders the specific node 20 non-operational, then the specific node 20 will omit transmitting the data during its unique transmission opportunity. Thus, the remaining nodes 20 that are part of the distributed computing system 10 observe silence during the unique transmission opportunity for the specific node 20. In response to observing silence during the unique transmission opportunity for the specific node 20, the remaining nodes 20 that are part of the distributed computing system 10 determine the specific node 20 is non-operational and is therefore no longer able to execute the corresponding node-specific applications 40. As explained below, the remaining nodes 20 that are part of the distributed computing system 10 are dynamically reconfigured in response to determining the specific node 20 is non-operational to execute the node-specific applications 40 that are no longer being executed by the specific node 20.

It is to be appreciated that in some instances, the specific node 20 may recover from the fault that caused the specific node 20 to become non-operational and may resume transmitting the data during its unique transmission opportunity. However, in one embodiment, the remaining nodes 20 that are part of the distributed computing system 10 will ignore the data transmitted by the specific node 20 after the specific node 20 resumes transmitting the data during its unique transmission opportunity. Alternatively, in another embodiment, the remaining nodes 20 are dynamically reconfigured to revert to the original configuration where each node 20 that is part of the distributed computing system 10 continues to execute its node-specific applications 40.

Dynamically reconfiguring the remaining nodes 20 that are part of the distributed computing system 10 shall now be described. In response to determining the specific node 20 is non-operational, the remaining nodes 20 that are each part of the distributed computing system 10 execute all the node-specific applications 40 that were previously executed by the specific node 20 that is now non-operational. As mentioned above, each node-specific application 40 executed by the specific node 20 that is part of the distributed computing system 10 is stored as a standby copy 44 in the standby database 42 corresponding to one of the remaining nodes 20 that are part of the distributed computing system 10. Therefore, all the node-specific applications that were previously executed by the specific node 20 are accessible and are available to the remaining nodes 20 that are part of the distributed computing system 10.

In the example as shown in FIG. 1, each of the remaining nodes 20 that are part of the distributed computing system 10 store one of the node-specific applications 40 executed by the specific node 20 in a corresponding standby database 42. Thus, each remaining node 20 executes one of the node-specific applications 40 that were previously executed by the specific node 20 that is now non-operational. Specifically, for example, in the event the node 20 assigned the node identifier 0 is non-operational, then the node 20 assigned the node identifier 1 executes the node-specific application A0,1, the node 20 assigned the node identifier 2 executes the node-specific application A0,2, the node 20 assigned the node identifier 3 executes the node-specific application A0,3, and the node 20 assigned the node identifier 4 executes the node-specific application A0,4. Thus, in the embodiment as shown in FIG. 1, the distributed computing system 10 tolerates a fault that renders one of node 20 non-functional by leveraging the spare computational capacity C available by each of the remaining nodes 20. In other words, the embodiment as shown in FIG. 1 illustrates an example where the standby copies 44 are distributed evenly throughout the nodes 20, where each node 20 is responsible for executing a single node-specific application 40 that are previously executed by another node 20.

Although FIG. 1 illustrates each of the remaining nodes 20 that are part of the distributed computing system 10 storing one of the node-specific applications 40 executed by the specific node 20 in a corresponding standby database 42, it is to be appreciated that this configuration is merely exemplary in nature. For example, in another embodiment, the remaining nodes 20 that are part of the distributed computing system 10 store standby copies 44 of more than one of the node-specific applications 40 executed by the specific node 20 in a corresponding standby database 42. For example, the node 20 assigned the node identifier 1 may store standby copies 44 of more than one of the node-specific applications 40 that are executed by the node 20 assigned the node identifier 0. It is also to be appreciated that while the example shown in FIG. 1 dynamically reconfigures the remaining nodes 20 that are part of the distributed computing system 10 in response to determining a single node 20 has become non-operational, in embodiments the distributed computing system 10 has capacity to dynamically reconfigure the remaining nodes 20 in response to more than one node 20 becoming non-operational as well. In this embodiment, the remaining nodes 20 that are part of the distributed computing system 10 would have sufficient spare computational capacity C to execute the node-specific applications 40 executed by two non-operational nodes 20 and have the corresponding standby copies 44 saved in their respective standby databases 42.

Figure 2:
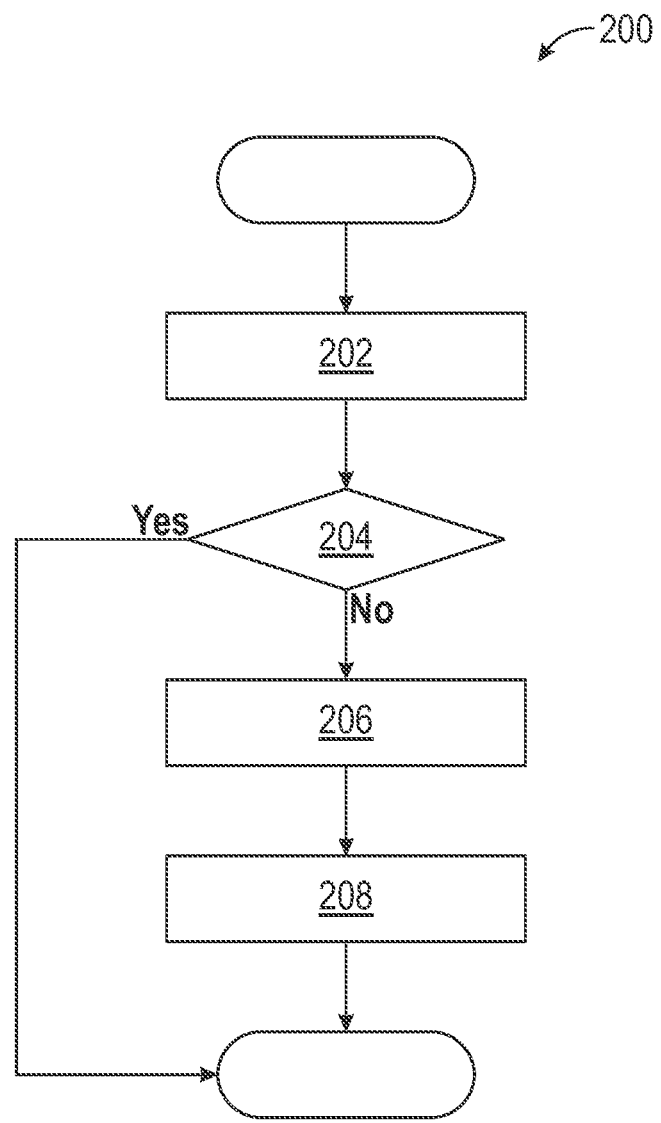
FIG. 2 is a process flow diagram illustrating a method for dynamically reconfiguring the plurality of nodes that are part of the fault tolerant distributed computing system, according to an exemplary embodiment.

FIG. 2 is a process flow diagram illustrating a method 200 for dynamically reconfiguring the plurality of nodes 20 that are part of the fault tolerant distributed computing system 10. Referring to FIGS. 1 and 2, the method 200 may begin at block 202. In block 202, the remaining nodes 20 that are part of the distributed computing system monitor the communication link 22 for the data transmitted by a specific node 20 during a unique transmission opportunity for the specific node 20. The method 200 may then proceed to decision block 204.

In decision block 204, the remaining nodes 20 that are part of the distributed computing system 10 either receive the data during the unique transmission opportunity corresponding to the specific node 20 or, alternatively, observe silence. In response to receiving the data during the unique transmission opportunity corresponding to the specific node 20, the method 200 may terminate. However, in response to the remaining nodes 20 that are part of the distributed computing system 10 observing silence during the unique transmission opportunity for the specific node 20, the method 200 proceeds to block 206.

In block 206, in response to observing silence during the unique transmission opportunity for the specific node 20, the remaining nodes 20 determine the specific node is non-operational.

In block 208, in response to determining the specific node 20 is non-operational, the remaining nodes 20 that are part of the distributed computing system 10 execute all the standby copies 44 of the node-specific applications 40 that were previously executed by the specific node 20 that is now non-operational. As mentioned above, the embodiment shown in FIG. 1 is merely one example of how the node-specific applications 40 are executed by the remaining nodes 20. The method 200 may then terminate.

Referring generally to the figures, the disclosed distributed computing system provides various technical effects and benefits. Specifically, the distributed computing system provides an approach for tolerating a fault that results in one of the nodes that are part of the system becoming non-operational, without the need to provide completely redundant nodes. In embodiments, the distributed computing system tolerates a fault that renders one of node non-functional by leveraging the spare computational capacity available by each of the remaining nodes, and therefore effectively leverages relatively small amounts of spare computational capacity that is distributed over the remaining nodes that are part of the distributed computing system.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A fault tolerant distributed computing system, comprising:
   a communication link; and
   a plurality of nodes in electronic communication with one another by the communication link, wherein each node executes one or more node-specific applications, includes a standby database that stores a standby copy corresponding to one of the node-specific applications executed by one of a remaining nodes that are part of the distributed computing system, and includes a spare computational capacity sufficient to execute at least one standby copy of one of the node-specific applications stored in the standby database, and wherein the plurality of nodes execute instructions to:
   during a unique transmission opportunity corresponding to a specific node, monitor, by the remaining nodes that are part of the distributed computing system, the communication link for data transmitted by the specific node;

observe, by the remaining nodes that are part of the distributed computing system, silence during the unique transmission opportunity for the specific node;

in response to observing silence during the unique transmission opportunity for the specific node, determine the specific node is non-operational; and in response to determining the specific node is non-operational, execute all the standby copies of the one or more node-specific applications that were previously executed by the specific node that is now non-operational by the remaining nodes that are each part of the distributed computing system.

2. The fault tolerant distributed computing system of claim 1, wherein each node-specific application executed by the specific node that is part of the distributed computing system is stored by the standby database corresponding to one of the remaining nodes that are part of the distributed computing system.

3. The fault tolerant distributed computing system of claim 1, wherein a number of node-specific applications executed by each node is equal to the number of remaining nodes that are part of the distributed computing system.

4. The fault tolerant distributed computing system of claim 1, wherein each of the remaining nodes that are part of the distributed computing system store one of the node-specific applications executed by the specific node in a corresponding standby database.

5. The fault tolerant distributed computing system of claim 1, wherein the remaining nodes that are part of the distributed computing system store more than one node-specific application executed by the specific node in a corresponding standby database.

6. The fault tolerant distributed computing system of claim 1, wherein the data transmitted by the specific node includes one of the following: state information, application data, or an alive code.

7. The fault tolerant distributed computing system of claim 1, wherein the communication link is a bus.

8. The fault tolerant distributed computing system of claim 6, wherein the communication link is implemented based on one of the following: a 10Base-T network communication protocol, switched Ethernet, the controller area network (CAN) protocol, and an automotive communication protocol based on the International Organization for Standardization (ISO) 17458-1 to 17458-5.

9. The fault tolerant distributed computing system of claim 1, wherein the communication link is implemented wirelessly.

10. The fault tolerant distributed computing system of claim 9, wherein the communication link is implemented based on the Institute of Electrical and Electronics Engineers (IEEE) 802.11 family of standards.

11. The fault tolerant distributed computing system of claim 1, wherein the communication link is implemented based on a network communication protocol where state information sent by any node that is part of distributed computing system is visible to the remaining nodes, and that affords a periodic, guaranteed transmission opportunity to all the nodes that are part of the fault tolerant distributed computing system.

12. The fault tolerant distributed computing system of claim 1, wherein the plurality of nodes represent electronic control modules (ECUs) that control one or more systems that are part of a vehicle.

13. The fault tolerant distributed computing system of claim 1, wherein the nodes represent one of the following: smart sensors and smart actuators.

14. A method for dynamically reconfiguring a plurality of nodes in electronic communication with one another by a communication link that are part of a fault tolerant distributed computing system, the method comprising:

during a unique transmission opportunity corresponding to a specific node, monitoring, by remaining nodes that are part of the distributed computing system, the communication link for data transmitted by the specific node, wherein each node executes one or more node-specific applications and includes a standby database that stores a standby copy that stores a standby copy corresponding to one of the node-specific applications executed by one of the remaining nodes that are part of the distributed computing system;

observing, by the remaining nodes that are part of the distributed computing system, silence during the unique transmission opportunity for the specific node;

in response to observing silence during the unique transmission opportunity for the specific node, determining the specific node is non-operational; and in response to determining the specific node is non-operational, executing all the standby copies of the one or more node-specific applications that were previously executed by the specific node that is now non-operational by the remaining nodes that are each part of the distributed computing system, wherein each node includes a spare computational capacity sufficient to execute at least one standby copy of one of the node-specific applications stored in the standby database.

15. A fault tolerant distributed computing system for a vehicle, comprising:

a communication link that is implemented as a bus; and a plurality of nodes in electronic communication with one another by the communication link, wherein the plurality of nodes represent ECUs that control one or more systems that are part of the vehicle, and wherein each node executes one or more node-specific applications, includes a standby database that stores a standby copy corresponding to one of the node-specific applications executed by one of a remaining nodes that are part of the distributed computing system, and includes a spare computational capacity sufficient to execute at least one standby copy of one of the node-specific applications stored in the standby database, and wherein the plurality of nodes execute instructions to:

during a unique transmission opportunity corresponding to a specific node, monitor, by the remaining nodes that are part of the distributed computing system, the communication link for data transmitted by a specific node;

observe, by the remaining nodes that are part of the distributed computing system, silence during the unique transmission opportunity for the specific node;

in response to observing silence during the unique transmission opportunity for the specific node, determine the specific node is non-operational; and in response to determining the specific node is non-operational, execute all the standby copies of the one or more node-specific applications that were previously executed by the specific node that is now non-operational by the remaining nodes that are each part of the distributed computing system.

16. The fault tolerant distributed computing system of claim 15, wherein each node-specific application executed by the specific node that is part of the distributed computing system is stored by the standby database corresponding to one of the remaining nodes that are part of the distributed computing system.

17. The fault tolerant distributed computing system of claim 15, wherein a number of node-specific applications executed by each node is equal to the number of remaining nodes that are part of the distributed computing system.

18. The fault tolerant distributed computing system of claim 15, wherein each of the remaining nodes that are part of the distributed computing system store one of the node-specific applications executed by the specific node in a corresponding standby database.

19. The fault tolerant distributed computing system of claim 15, wherein the remaining nodes that are part of the distributed computing system store more than one node-specific application executed by the specific node in a corresponding standby database.

20. The fault tolerant distributed computing system of claim 15, wherein the data transmitted by the specific node includes one of the following: state information, application data, or an alive code.

\* \* \* \* \*